United States Patent
Park et al.

(10) Patent No.: US 9,870,829 B2
(45) Date of Patent: Jan. 16, 2018

(54) FLASH MEMORY APPARATUS FOR PHYSICAL UNCLONABLE FUNCTION AND EMBODYING METHOD OF THE SAME

(71) Applicant: Korea University Research and Business Foundation, Seoul (KR)

(72) Inventors: Jong Sun Park, Seoul (KR); Sang Kyu Lee, Cheongju-Si (KR)

(73) Assignee: Korea University Research and Business Foundation, Seoul (KR)

(*) Notice: Subject to any disclaimer, the term of this patent is extended or adjusted under 35 U.S.C. 154(b) by 121 days.

(21) Appl. No.: 14/831,411

(22) Filed: Aug. 20, 2015

(65) Prior Publication Data

US 2016/0093393 A1 Mar. 31, 2016

(30) Foreign Application Priority Data

Sep. 30, 2014 (KR) .................. 10-2014-0130979

(51) Int. Cl.
| | | |
|---|---|---|
| *H04L 9/32* | (2006.01) | |
| *G11C 16/26* | (2006.01) | |
| *G11C 16/10* | (2006.01) | |
| *G11C 29/00* | (2006.01) | |
| *G11C 29/02* | (2006.01) | |
| *G11C 11/56* | (2006.01) | |

(52) U.S. Cl.
CPC .............. *G11C 16/26* (2013.01); *G11C 16/10* (2013.01); *G11C 29/021* (2013.01); *G11C 29/028* (2013.01); *G11C 29/76* (2013.01); *H04L 9/3278* (2013.01); *G11C 11/5642* (2013.01); *H04L 2209/34* (2013.01)

(58) Field of Classification Search
CPC ..... H04L 9/3278; H04L 9/3271; G11C 16/10; G11C 11/5642
See application file for complete search history.

(56) References Cited

U.S. PATENT DOCUMENTS

| | | | | |
|---|---|---|---|---|
| 6,161,213 A | * | 12/2000 | Lofstrom | H01L 23/544 257/E23.179 |
| 8,290,150 B2 | * | 10/2012 | Erhart | H04L 9/302 380/44 |
| 8,616,979 B1 | * | 12/2013 | Daniel | A63F 13/245 463/20 |

(Continued)

FOREIGN PATENT DOCUMENTS

KR 10-1408619 B1 6/2014

*Primary Examiner* — Ellen Tran
(74) *Attorney, Agent, or Firm* — Fox Rothschild LLP

(57) ABSTRACT

A flash memory apparatus having a physical unclonable function (PUF) and an embodying method of the same are provided. To elaborate, the flash memory apparatus includes a flash memory unit that comprises a main memory area and a peripheral memory area; a challenge input unit that receives input of a challenge value; a read voltage setting unit that sets a read voltage based on the input challenge value; a data reading unit that reads data by applying the read voltage to a memory cell included in a pre-set memory area in the peripheral memory area each time the challenge value is input; and a response output unit that outputs the read data as a response value corresponding to the challenge value, wherein the pre-set memory area consists of a plurality of memory cells comprising two or more memory cells having different threshold voltage values.

18 Claims, 7 Drawing Sheets

(56) References Cited

U.S. PATENT DOCUMENTS

2008/0279373 A1* 11/2008 Erhart .................... H04L 9/302
                                                              380/46
2011/0317829 A1* 12/2011 Ficke ................... H04L 9/3278
                                                              380/46
2013/0156183 A1*  6/2013 Komano .............. H04L 9/0866
                                                              380/44

* cited by examiner

FLASH MEMORY APPARATUS FOR PHYSICAL UNCLONABLE FUNCTION AND EMBODYING METHOD OF THE SAME

CROSS-REFERENCE TO RELATED APPLICATION

This application claims the benefit of Korean Patent Application No. 10-2014-0130979 filed on Sep. 30, 2014, the entire disclosures of which are incorporated herein by reference.

FIELD OF THE INVENTION

The present disclosure generally concerns a flash memory apparatus for processing a physical unclonable function (PUF), and an embodying method of the same.

BACKGROUND

A physical unclonable function (PUF) is a technology related to the field of authentication and security and generates a physically unique code. Conventionally, there have been suggested technologies, which generate unique keys by using a SRAM, a ring oscillator, a latch, etc., depend on their physical characteristics.

In this regard, Korean Patent No. 1408619 (Title of Invention: Physical Unclonable Function System Based on Capacitance Variations) describes a physical unclonable function system, which includes two or more physical unclonable function (PUF) cells and a control signal generation unit that generates a control signal for controlling operation of each of the physical unclonable function cells, wherein each of the physical unclonable function cells operates according to the control signal, and includes a charge sharing circuit that includes a circuit where two or more capacitors are arranged in parallel, a comparator that detects a capacitance difference of some of the capacitors in the charge sharing circuit, and a logical exclusive-OR gate that implements a logical exclusive OR for an input signal (challenge) and a signal output from the comparator to output an output signal (response) as a result of the logical exclusive OR.

Meanwhile, since there has been no technology relating to a method for generating a key by using a memory being used in most devices, a method that can embody the PUF without requiring a separate significant correction within a memory is necessary.

SUMMARY

In view of the foregoing, the present disclosure concerns a flash memory apparatus, which has a physical unclonable function (PUF) to generate a unique response value in response to a challenge value by using a flash memory, and an embodying method thereof.

However, the problems sought to be solved by the present disclosure are not limited to the above description, and other problems can be clearly understood by those skilled in the art from the following description.

In some scenarios, there is provided a flash memory apparatus having a physical unclonable function (PUF). The flash memory apparatus may include: a flash memory unit that comprises a main memory area and a peripheral memory area; a challenge input unit that receives input of a challenge value; a read voltage setting unit that sets a read voltage based on the input challenge value; a data reading unit that reads data by applying the read voltage to a memory cell included in a pre-set memory area in the peripheral memory area based on the challenge value each time the challenge value is input; and a response output unit that outputs the read data as a response value corresponding to the challenge value. The setting data regarding an operation environment of the flash memory unit are stored in the peripheral memory area, and the pre-set memory area consists of a plurality of memory cells including two or more memory cells having different threshold voltage values.

In those or other scenarios, there is provided a method for embodying a physical unclonable function (PUF) through a flash memory apparatus. The flash memory apparatus may include a flash memory unit having a main memory area and a peripheral memory area. The method may include: receiving input of a challenge value; setting a read voltage based on the challenge value; reading data by applying the read voltage to a memory cell included in a pre-set memory area of the peripheral memory area; and outputting the read data as a response value corresponding to the challenge value. The setting data regarding an operation environment of the flash memory unit are stored in the peripheral memory area. The pre-set memory area consists of a plurality of memory cells including two or more memory cells having different threshold voltages.

In those or other scenarios, a read voltage for a memory cell of a flash memory is changed each time a challenge value is input, so that a random response value can be generated by using a typical physical characteristic of each memory cell. As a result, security of a PUF key can be greatly improved.

Further, the response value is generated by using setting data that are stored in a peripheral memory area of the flash memory, so that a PUF key depending on the typical characteristic of the corresponding flash memory can be generated.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

Non-limiting and non-exhaustive embodiments of the present disclosure will be described in conjunction with the accompanying drawings. Understanding that these drawings depict only several embodiments in accordance with the disclosure and are, therefore, not to be intended to limit its scope, the disclosure will be described with specificity and detail through use of the accompanying drawings, in which.

DETAILED DESCRIPTION

Figure 1:
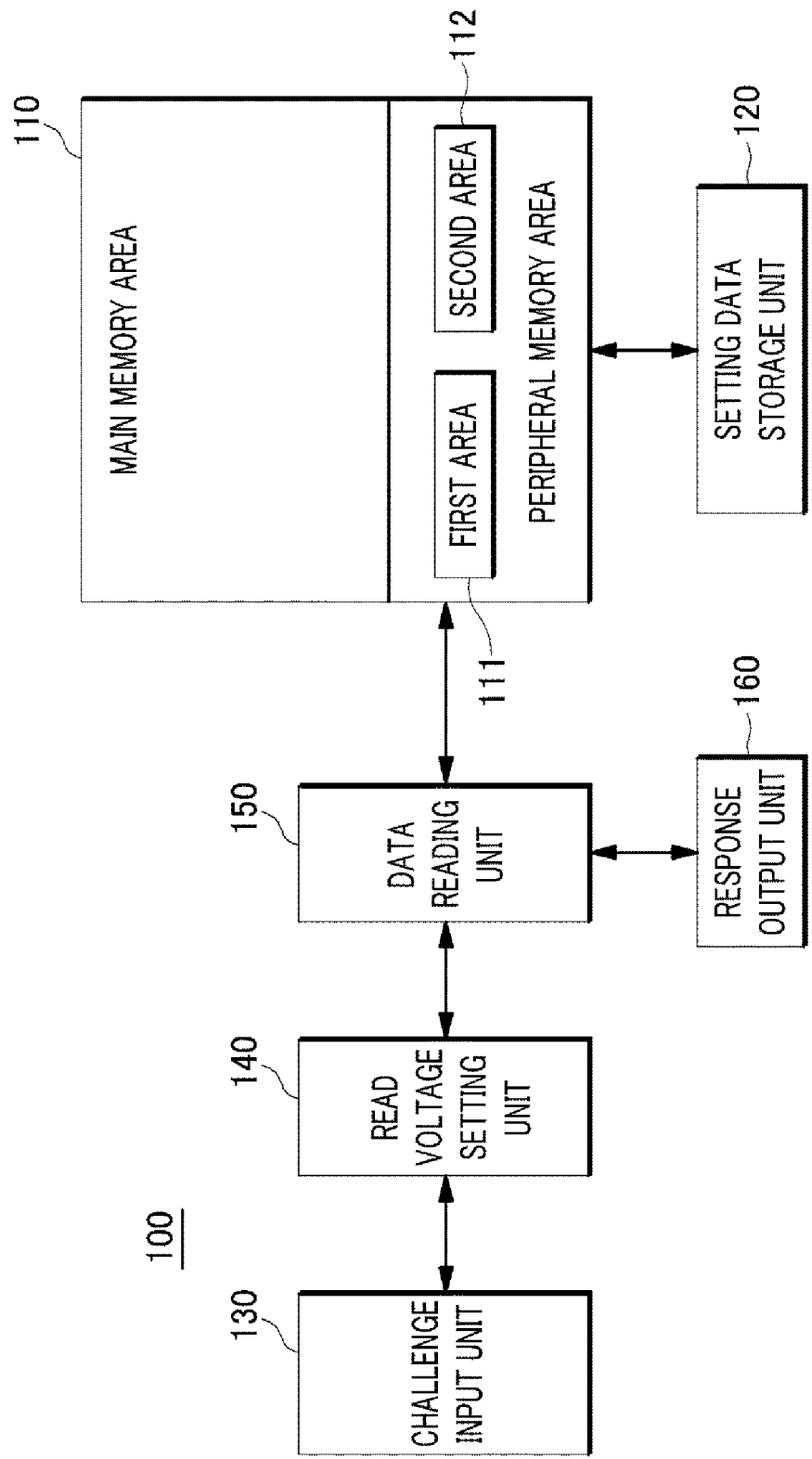
FIG. 1 shows a configuration of a flash memory apparatus using a flash memory.

Hereinafter, example embodiments will be described in detail with reference to the accompanying drawings so that inventive concept may be readily implemented by those skilled in the art. However, it is to be noted that the present disclosure is not limited to the example embodiments but can be realized in various other ways. In the drawings, certain parts not directly relevant to the description are omitted to enhance the clarity of the drawings, and like reference numerals denote like parts throughout the whole document.

Throughout the whole document, the terms "connected to" or "coupled to" are used to designate a connection or coupling of one element to another element and include both a case where an element is "directly connected or coupled to" another element and a case where an element is "electronically connected or coupled to" another element via still another element. Further, the term "comprises or includes" and/or "comprising or including" used in the document means that one or more other components, steps, operations, and/or the existence or addition of elements are not excluded in addition to the described components, steps, operations and/or elements.

FIG. 1 shows a configuration of a flash memory apparatus 100 using a flash memory.

The flash memory apparatus 100 includes a flash memory unit 110, a setting data storage unit 120, a challenge input unit 130, a read voltage setting unit 140, a data reading unit 150 and a response output unit 160.

In some scenarios, the flash memory unit 110 is a NAND type flash memory, in which two or more cell transistors are connected to each other in series in one (1) bit line. In addition, the flash memory unit 110 is a single level cell (SLC) NAND flash memory, which stores one-bit data in one (1) memory cell. However, a flash memory is not limited to the above-described memories, and may be various types of flash memories like a NOR type flash memory, in which two or more cell transistors are connected to each other in parallel in one (1) bit line, or a multi-level cell (MLC) type flash memory, which stores two-bit data in one (1) memory.

In addition, as illustrated in FIG. 1, the flash memory unit 110 includes a main memory area and a peripheral memory area. User data or the like are stored in the main memory area, and a variety of environment information (hereinafter, referred-to as 'setting data') necessary for the operation of the flash memory are stored in the peripheral memory area.

The flash memory unit 110 may be a device further including additional components such as a control circuit (not illustrated), a page buffer (not illustrated), and various switch units (not illustrated). For example, the control circuit (not illustrated) generates a control signal for controlling reading setting data associated with the general operation of the memory. The page buffer (not illustrated) separately stores the setting data that have been read in response to the control signal. The various switch units include a DC trim circuit, a repair circuit and others, and operate by a bit value of the setting data stored in the page buffer. Since the additional components of the flash memory unit 110 are common and are not directly related to the core technology of the example embodiments, description of the components is omitted herein.

The peripheral memory area of the flash memory unit 110 has a specific area ('a first area 111' and 'a second area 112' in FIG. 1), in which data for generating a response value of the PUF are stored, and which is separate from a basic area in the peripheral memory area, in which the setting data for the operation of the flash memory unit 110 are stored. This specific area may consist of one (1) area or two or more divided areas. Where the specific area consists of two or more divided areas, the areas may be adjacent to each other or provided at random separate positions. In addition, the specific area may use at least part of the basic area, in which the setting data are stored, depending on a type of data to be used for generating the response value of the PUF. The specific area consists of a multiple number of memory cells including two or more memory cells having different threshold voltages.

Specifically, in the first area 111 of the peripheral memory area of the flash memory unit 110, data values of the multiple memory cells included in the first area 11 are random, and the first area 111 is programmed such that two or more of the multiple memory cells have different data values. That is, logical values "1" and "0" for the multiple memory cells may be randomly distributed and stored in the first area 111. These random data values are read by the data reading unit 150 to be used as a response value.

The setting data storage unit 120 detects setting data at an initial test time point after power supply is applied to the flash memory unit 110, to program the setting data in one area (e.g., the second area 112) of the peripheral memory area of the flash memory unit 110. In this case, the setting data detected by the setting data storage unit 120 may include at least one of a variety of information that enable the flash memory unit 110 to operate. For example, the setting data may include voltage information, current information, speed information, trim information, option information, repair information and bad block information. For example, the setting data storage unit 120 may use electrical fuse (E-Fuse) data as the setting data. Instead of laser fuse, the E-Fuse method stores a variety of information in a memory cell, reads the information when the flash memory unit 110 operates, and makes a corresponding switch on/off so as to deliver the information. The data information stored in the E-Fuse form may be stored in advance at a test stage for the specific area of the memory cell.

The setting data storage unit 120 detects at least one of an initial voltage, an initial current, and an initial speed actually generated in the flash memory unit 110 through the initial test. In addition, the setting data storage unit 120 generates trim information to compensate the detected initial voltage, initial current and initial speed to correspond to a reference voltage, a reference current and a reference speed, which have been pre-set with respect to driving of the flash memory unit 110. The setting data storage unit 120 programs a trimming code composing the trim information in the second area 112. Accordingly, the setting data storage unit 120 stores the setting data to be used as a response value.

Figure 3:
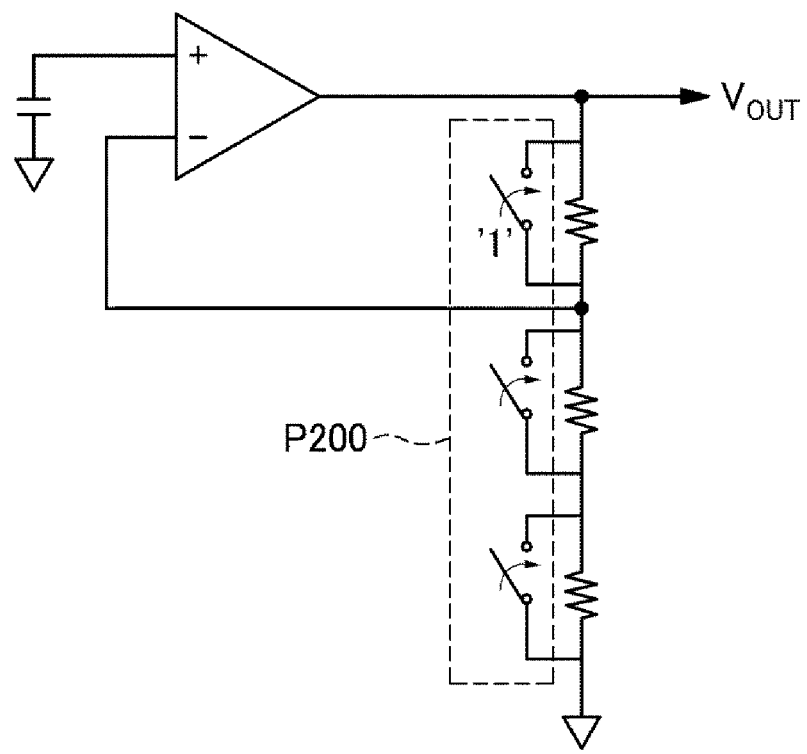
FIG. 3 shows an example for a circuit for generating trim information.

FIG. 3 shows an example for a circuit for generating the trim information.

Where a voltage level ($V_{OUT}$) detected through the initial test has a different value from that of a pre-set reference voltage level (e.g., a pre-set program voltage level, a read voltage level, and an erase voltage level), the setting data storage unit 120 generates trim information to compensate the difference. In this case, the setting data storage unit 120 controls at least one of compensation switches P200 as illustrated in FIG. 3, to detect the trim information to compensate the detected voltage level ($V_{OUT}$) to correspond to the reference voltage level. Specifically, when the compensation switches P200 illustrated in FIG. 3 turn on, the voltage level is processed to be a bit '1,' and when the compensation switches P200 turn off, the voltage level is processed to be a bit '0.' Accordingly, a trimming code having the same number of bits as that of the compensation switches P200 may be detected.

The setting data storage unit 120 processes a data reading process for all the memory cells of the flash memory unit 110 through the initial test. Accordingly, the setting data storage unit 120 detects bad block information, for which a data reading process has been failed. In addition, the setting data storage unit 120 programs an address of a defective bit line and an address of a defective block, which compose the bad block information, in the second area 112. Accordingly, the setting data storage unit 120 stores the setting data to be used as a response value.

Figure 4:
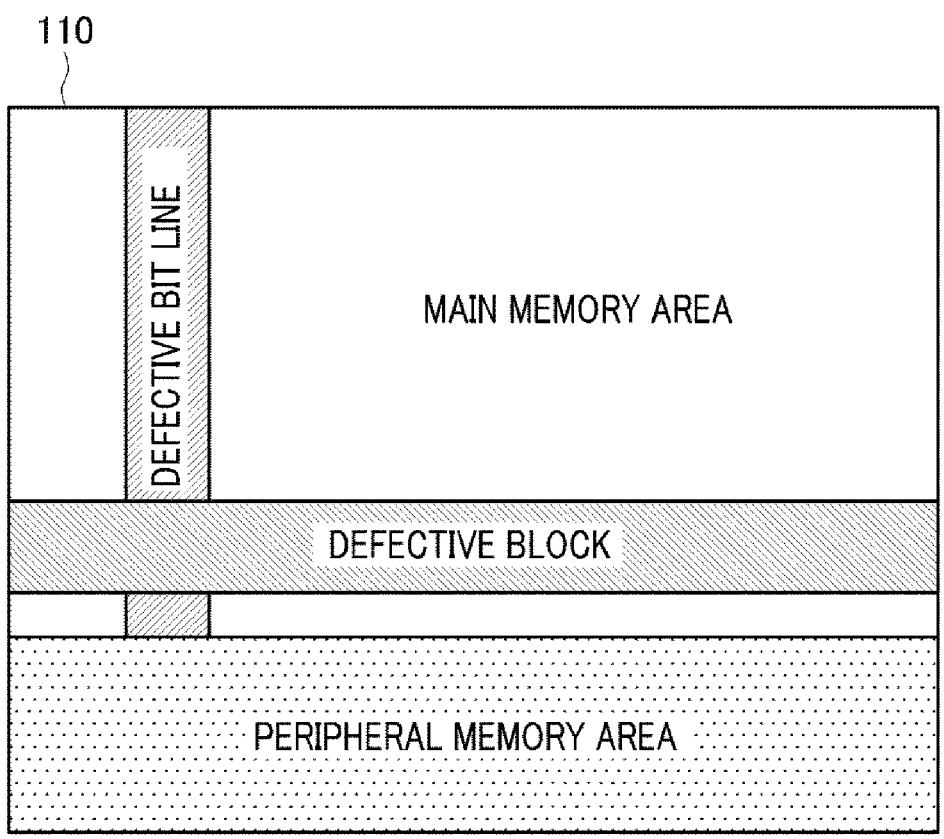
FIG. 4 shows an example for part of a memory unit for generating bad block information.

FIG. 4 shows an example for a method for generating the bad block information.

The setting data storage unit 120 processes reading of all the memory cells of the flash memory unit 110 through the initial test, to identify a defective bit line and a defective memory cell block. In addition, the setting data storage unit 120 detects address information of at least one of the defective bit line and the defective block identified within the memory unit 110 as illustrated in FIG. 4.

The setting data storage unit 120 detects repair information in the basic area in the peripheral memory area, in which the setting data are stored. Then, the setting data storage unit 120 programs the detected repair information in the second area 112. Accordingly, the setting data storage unit 120 stores the setting data to be used as a response value. The repair information may be used to control the repair circuit for repairing the defective bit line and defective block.

Meanwhile, with respect to FIG. 1, it has been described that the first area 111, in which a random data value is stored, and the second area 112, in which a data value based on setting data is stored, are discriminated from each other. However, the first area 111 and the second area 112 may be provided as one area, and the data stored in the respective areas may overlap with one another. In addition, it has been described that different data are stored in the first area 111 and the second area 112, and both the two different data are used as response values. However, only one of the two memory areas may be provided, or both the two memory areas may be provided, and only the data stored in one of the memory areas may be used as a response value.

Returning to FIG. 1, the challenge input unit 130 receives input of a challenge value generated in an external device (e.g., an authentication processing server pre-set to inter-work with the flash memory apparatus 100) or the flash memory apparatus 100 itself. The challenge value input in the challenge input unit 130 may include information to command generation of a response value, or information for setting a specific read voltage to generate a response value. In addition, the flash memory apparatus 100 may further include a separate challenge value generation unit (not illustrated).

When the challenge value is input, the read voltage setting unit 140 sets a read voltage for reading data of a pre-set specific memory cell among the memory cells included in the flash memory unit 110. The read voltage setting unit 140 changes and sets the read voltage within a pre-set voltage level range each time the challenge value is input. As the read voltage changes, a data value read in a memory cell of the flash memory unit 110 may change. For example, assuming that when a level of the read voltage is set to a first read voltage level, a data value of a random memory cell is read as "1," the data value of the same memory cell may be read as "0" when the level of the read voltage is set to a second read voltage level.

Figure 2A:
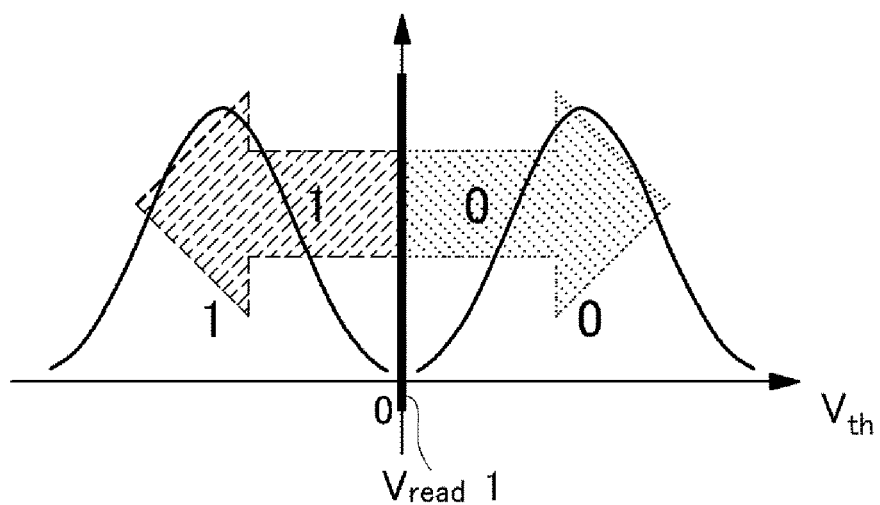
FIG. 2A is a graph for describing a data value of a memory cell when a first read voltage is used.
Figure 2B:
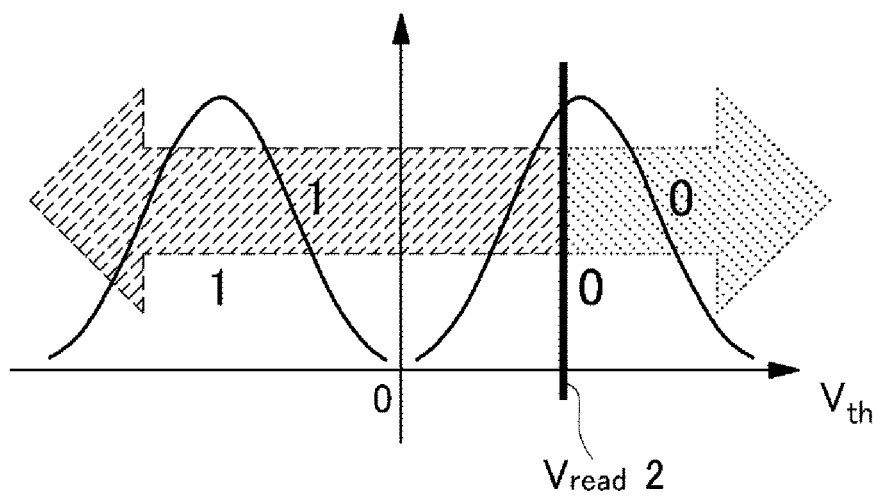
FIG. 2B is a graph for describing a data value of a memory cell when a second read voltage is used.
Figure 2C:
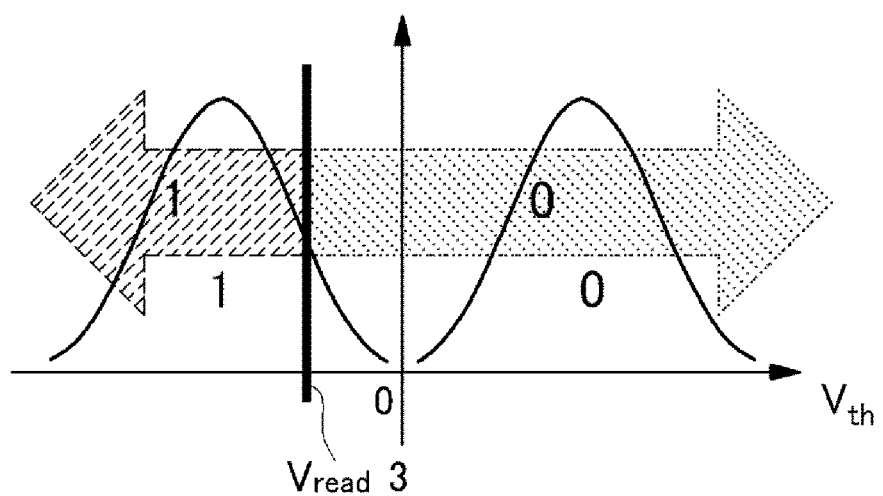
FIG. 2C is a graph for describing a data value of a memory cell when a third read voltage is used.

FIG. 2A to FIG. 2C are graphs for describing change of a data value of an identical memory cell through change of a read voltage. FIG. 2A is a graph for describing a data value of a memory cell when a first read voltage is used. FIG. 2B is a graph for describing a data value of a memory cell when a second read voltage is used. FIG. 2C is a graph for describing a data value of a memory cell when a third read voltage is used.

First, as shown in FIG. 2A, it is assumed that when the level of the read voltage ($V_{read}$ 1) is set to '0,' the number of memory cells, of which data values are read as '1' at the first read voltage ($V_{read}$ 1), and the number of memory cells, of which data values are read as '0' at the first read voltage ($V_{read}$ 1), are the same.

As shown in FIG. 2B, when the level of the read voltage is changed and set to the second read voltage ($V_{read}$ 2) higher than the first read voltage level (i.e., '0'), at least part of the memory cells, of which data values are read as '0' at the first read voltage ($V_{read}$ 1), is changed into and read as '1.'

As shown in FIG. 2C, when the level of the read voltage is changed and set to the third read voltage ($V_{read}$ 3) lower than the first read voltage level (i.e., '0'), at least part of the memory cells, of which data values are read as '1' at the first read voltage ($V_{read}$ 1), is changed into and read as '0.'

That is, as the read voltage setting unit 140 changes the level of the read voltage, a data value read in an identical memory cell changes. Since this phenomenon occurs due to a threshold voltage value of each of the memory cells, which is a physical characteristic, a unique value of the corresponding flash memory can be generated as a response value of the PUF so that the security can be greatly improved.

The read voltage setting unit 140 may detect a read voltage pre-matched with each input challenge value from a multiple number of pre-set read voltage levels each time the challenge value is input, to set the detected read voltage as a read voltage to be applied to the memory cell.

Returning to FIG. 1, the data reading unit 150 applies the read voltage to a pre-set memory area in the peripheral memory area of the flash memory unit 110 so as to read data. The set memory area may be set to at least one of the first area 111 and the second area 112. In this case, the data reading unit 150 may apply the read voltage in a unit of a block including all or at least one of the multiple memory cells included in the set memory area. In addition, the data reading unit 150 applies the read voltage differently set for each input of the challenge value, to read different data in response to the read voltages.

The response output unit 160 outputs the data read through the data reading unit 150 as a response value corresponding to the input challenge value.

In the flash memory apparatus 100 described above with respect to FIG. 1 to FIG. 4, at least one of the setting data storage unit 120, the challenge input unit 130, the read voltage setting unit 140, the data reading unit 150, and the response output unit 160 may be included in the peripheral memory area of the flash memory unit 110.

Meanwhile, the physical unclonable function (PUF) embodied by the flash memory apparatus 100 may be used for authentication processing. Accordingly, a flash memory apparatus may promise a pair of a challenge value and a response value, which have been generated by using data of the memory cells of the flash memory, to a pre-set authentication processing device (e.g., an authentication server). In addition, upon authentication processing later, the authentication processing may be implemented by comparing a response value, which is generated through the flash memory apparatus to correspond to a challenge value, and a response value, which is matched with the corresponding challenge value pre-stored in the authentication processing device, with each other.

Figure 5:
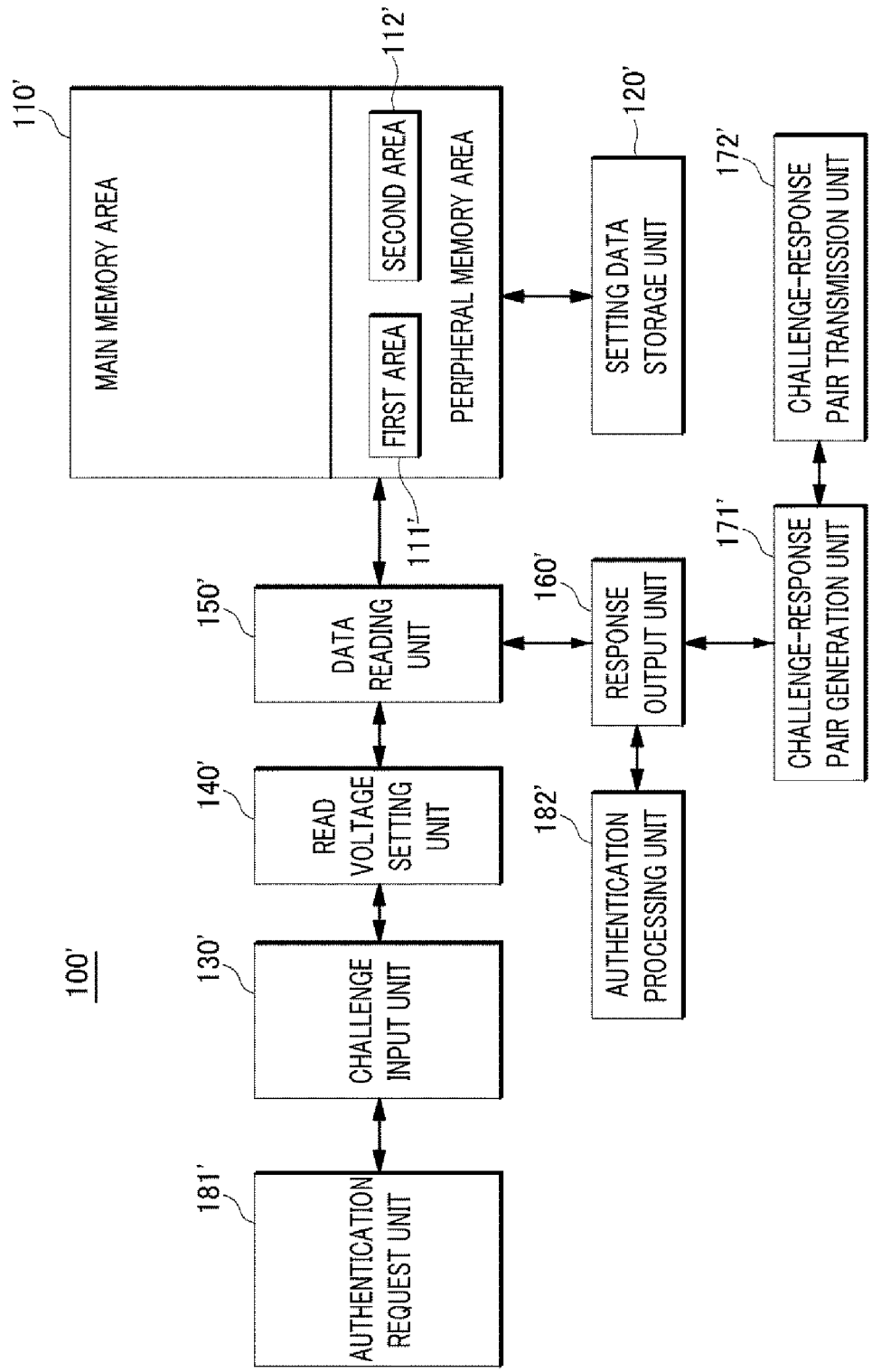
FIG. 5 shows a configuration of a flash memory apparatus.

FIG. 5 shows a configuration of the flash memory apparatus.

A flash memory apparatus 100' includes a flash memory unit 110', a setting data storage unit 120', a challenge input unit 130', a read voltage setting unit 140', a data reading unit 150', a response output unit 160', a challenge-response pair generation unit 171, a challenge-response pair transmission unit 172, an authentication request unit 181 and an authentication processing unit 182.

Hereinafter, description of the components (e.g., a flash memory unit 110', a first area 111', a second area 112', a setting data storage unit 120', a challenge input unit 130', a read voltage setting unit 140', a data reading unit 150' and a response output unit 160' in FIG. 5) of the flash memory apparatus 100', which are identical to the components (e.g., a flash memory unit 110, a first area 111, a second area 112, a setting data storage unit 120, a challenge input unit 130, a read voltage setting unit 140, a data reading unit 150 and a response output unit 160 in FIG. 1) of the flash memory apparatus 100 that have been described with reference to FIG. 1 to FIG. 4, is omitted to avoid overlapping description.

The challenge-response pair generation unit 171 sequentially inputs a multiple challenge values promised in advance to the pre-set authentication processing device (e.g., an authentication server) (not illustrated) into the challenge input unit 110'. In addition, the challenge-response pair generation unit 171 matches response values, which are sequentially output from the response output unit as a result of the input of the challenge values, with the input challenge values, respectively, to generate a multiple number of challenge-response pairs. In this case, the challenge-response pair generation unit 171 may store the corresponding challenge-response pairs in one area of the flash memory unit 110' to make a database.

The challenge-response pair transmission unit 172 provides the generated multiple challenge-response pairs to the authentication processing device (not illustrated) to store the challenge-response pairs therein.

The authentication request unit 181 sequentially inputs, as an authentication request, the challenge values received from the authentication processing device (not illustrated) or the challenge values generated in the flash memory apparatus 100' itself into the challenge input unit 110.

The authentication processing unit 182 implements authentication processing by transmitting, to the authentication processing device (not illustrated), the response values output from the response output unit 160' in correspondence with the challenge values input by the authentication request unit 181.

In this case, the authentication processing device (not illustrated) detects a response value, which corresponds to the challenge value that the flash memory apparatus 100' has used to generate the response value, from the challenge-response pairs stored in the authentication processing device itself. In addition, the authentication processing device (not illustrated) compares the detected response value and the response value transmitted by the authentication processing unit 182 of the flash memory apparatus 100' with each other to process authentication. That is, the authentication processing device (not illustrated) compares the response value transmitted by the authentication processing unit 182 and the response value pre-stored in the authentication processing device (not illustrated) with respect to an identical challenge value, and if the two response values match with each other, the authentication can be successfully processed.

In the flash memory apparatus 100' described above with reference to FIG. 5, at least one of the setting data storage unit 120', the challenge input unit 130', the read voltage setting unit 140', the data reading unit 150', and the response output unit 160' may be included in the peripheral memory area of the flash memory unit 110'.

Figure 6:
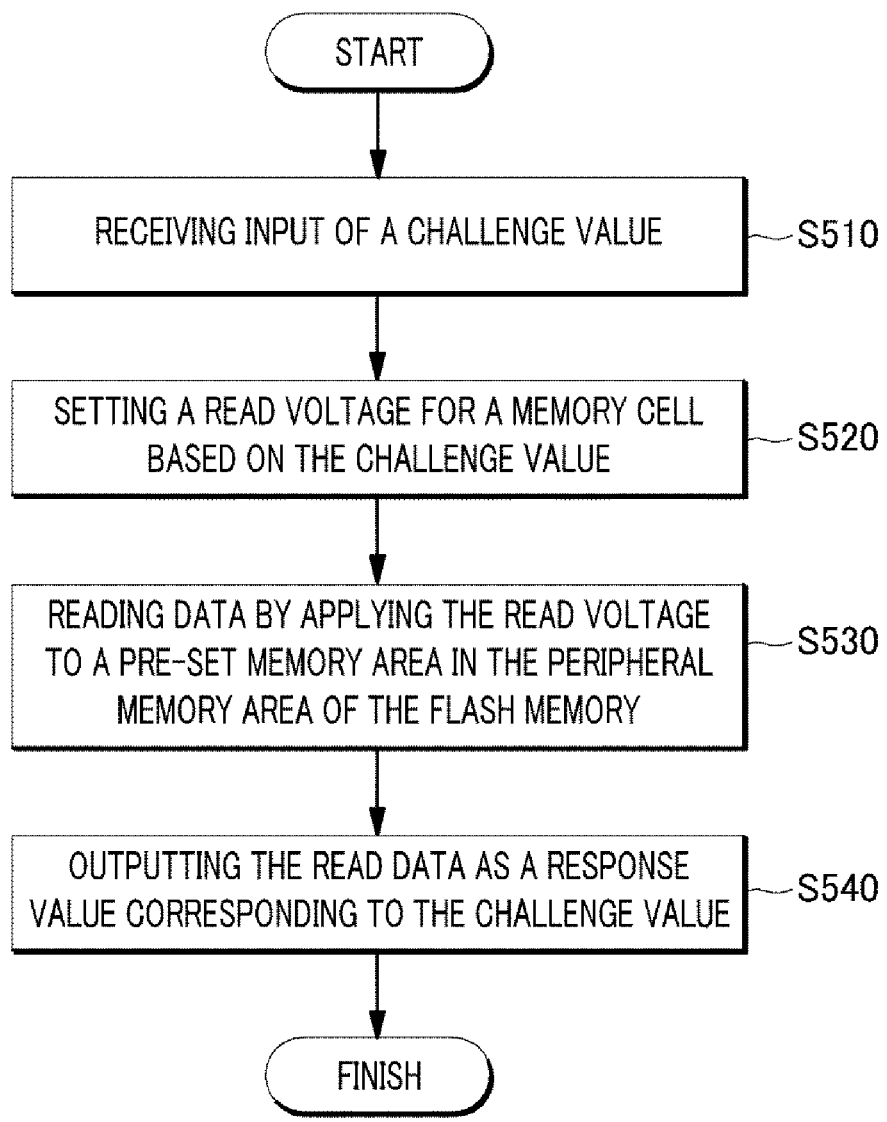
FIG. 6 is a flow chart for describing a method for embodying a physical unclonable function by using a flash memory.

FIG. 6 is a flow chart for describing a method for embodying the physical unclonable function by using the flash memory apparatus.

First, a challenge value, which has been generated from the outside of the flash memory apparatus or generated in the flash memory apparatus itself, is input (S510).

Based on the input challenge value, a read voltage for a pre-set specific memory cell on the flash memory unit is set (S520).

In this case, the specific memory cell is at least one memory area set on the peripheral memory area of the flash memory unit, and the set memory area includes at least one memory cell. In addition, the read voltage may be set to any one of the read voltage levels pre-matched with the challenge values.

Next, the set read voltage is applied to the memory cell of the specific memory area in the peripheral memory area of the flash memory unit to read data (S530).

That is, in order to generate a response value corresponding to a challenge value, data of the memory cells of the pre-set specific memory area are read as a response value. In this case, data having different values may be randomly programmed in two or more of the multiple memory cells included in the specific memory area. In addition, the specific memory area may be in the state that it is programmed with at least one of voltage information, current information, speed information, trim information, option information, repair information, and bad block information, which are detected at the time point of the initial test for the flash memory unit to operate the flash memory unit. Accordingly, in S530, random data values or data values depend on a typical physical characteristic of each of the memory cells of the flash memory unit are read.

In addition, in S520, the read voltage may be changed and set within the pre-set voltage level range each time the challenge value is input. Accordingly, the data values read in S530 may have different values for the inputs of the challenge values even for an identical memory cell block.

Next, the data read in S530 are output as response values corresponding to the input challenge values to embody the PUF (S540).

Meanwhile, a method for embodying a physical unclonable function of a flash memory apparatus may further implement transmitting a challenge-response pair to the authentication processing device connected to the flash memory apparatus. As a result, the challenge-response pairs promised between the flash memory apparatus and the authentication processing device is stored.

Specifically, the following additional steps may be implemented prior to S510.

A multiple number of challenge values promised to the authentication processing device are sequentially input. Thereafter, a read voltage for each of the input challenge values is set, and based on the input challenge values, the set read voltage is applied to the memory cells included in the pre-set specific memory area to read data. Thereafter, the read data are output as response values corresponding to the input challenge values. A multiple number of challenge-response pairs are generated by matching the output response values and the input challenge values with each other. Thereafter, the multiple challenge-response pairs are provided to the authentication processing device. In this case, the transmitted challenge-response pairs are stored in the authentication processing device.

In addition, under the circumstance that the above-described additional steps for authentication processing have been implemented, the authentication processing with the authentication processing device may be implemented after the implementation of S510 to S540.

Specifically, in S510, the challenge values received from the pre-set authentication processing device or the challenge values generated in the flash memory apparatus itself are input as an authentication request. After S520 to S540 are sequentially implemented, the authentication processing may be further implemented by transmitting the output response values to the authentication processing device. In this case, the authentication processing device that has received a response value corresponding to a specific challenge value from the flash memory apparatus compares a response value matched with the specific challenge value among the pre-stored challenge-response pairs and the response value received from the flash memory apparatus with each other so as to implement the authentication processing.

The above described method can be embodied in a storage medium including instruction codes executable by a computer or processor such as a program module executed by the computer or processor. A computer readable medium can be any usable medium which can be accessed by the computer and includes all volatile/nonvolatile and removable/non-removable media. Further, the computer readable medium may include all computer storage and communication media. The computer storage medium includes all volatile/nonvolatile and removable/non-removable media embodied by a certain method or technology for storing information such as computer readable instruction code, a data structure, a program module or other data. The communication medium typically includes the computer readable instruction code, the data structure, the program module, or other data of a modulated data signal such as a carrier wave, or other transmission mechanism, and includes information transmission mediums.

The above description of the example embodiments is provided for the purpose of illustration, and it would be understood by those skilled in the art that various changes and modifications may be made without changing technical conception and essential features of the example embodiments. Thus, it is clear that the above-described example embodiments are illustrative in all aspects and do not limit the present disclosure. For example, each component described to be of a single type can be implemented in a distributed manner. Likewise, components described to be distributed can be implemented in a combined manner.

The scope of the inventive concept is defined by the following claims and their equivalents rather than by the detailed description of the example embodiments. It shall be understood that all modifications and embodiments conceived from the meaning and scope of the claims and their equivalents are included in the scope of the inventive concept.

The invention claimed is:

1. A flash memory apparatus having a physical unclonable function (PUF), comprising:
   a flash memory unit that comprises a main memory area and a peripheral memory area;
   a challenge input unit that receives input of a challenge value;
   a read voltage setting unit that sets a read voltage based on the input challenge value;
   a data reading unit that reads data by applying the read voltage to a memory cell included in the peripheral memory area based on the challenge value each time the challenge value is input; and
   a response output unit that outputs the read data as a response value corresponding to the challenge value;
   wherein the data reading unit reads at least one of a first data value based on setting data regarding an operation environment of the flash memory unit and a second value stored randomly in a pre-set memory area in the peripheral memory area, the pre-set memory area includes a plurality of memory cells comprising two or more memory cells having different threshold voltage values; and
   wherein the read voltage is changeable within a pre-set voltage level range each time the challenge value is input.

2. The flash memory apparatus of claim 1, wherein the read voltage setting unit detects a read voltage pre-matched with each of the challenge values from the plurality of the pre-set read voltage levels, and sets the detected read voltage as a read voltage to be applied to the memory cell.

3. The flash memory apparatus of claim 1, wherein different data are randomly stored in at least two of the plurality of the memory cells included in the pre-set memory area.

4. The flash memory apparatus of claim 1, further comprising a setting data storage unit that detects at least one of voltage information, current information, speed information, trim information, option information, repair information, and bad block information, which operate the flash memory unit, from the setting data at the time of an initial test for the flash memory unit, and programs the at least one detected information in the pre-set memory area.

5. The flash memory apparatus of claim 4, wherein the setting data storage unit
   detects trim information to compensate at least one of an initial voltage, an initial current and an initial speed, which are generated in the flash memory unit through the initial test, to correspond to a reference voltage, a reference current and a reference speed, which are pre-set for driving of the flash memory unit, and
   programs a trimming code composing the detected trim information in the pre-set memory area.

6. The flash memory apparatus of claim 4, wherein the setting data storage unit
   detects bad block information, for which a data reading process in the flash memory unit through the initial test has been failed, and
   programs an address of at least one of a defective bit line and a defective block composing the detected bad block information in the pre-set memory area.

7. The flash memory apparatus of claim 4, wherein the setting data storage unit
   detects repair information in a basic area in the peripheral memory area, in which the setting data are stored, and
   programs the detected repair information in the pre-set memory area.

8. The flash memory apparatus of claim 1, further comprising:
a challenge-response pair generation unit that sequentially inputs a plurality of challenge values promised in advance to a pre-set authentication processing device into the challenge input unit, and matches response values output from the response output unit as a result of the input of the challenge values with the input challenge values to generate a plurality of challenge-response pairs; and
a challenge-response pair transmission unit that provides the plurality of the challenge-response pairs to the authentication processing device,
wherein the challenge-response pairs are stored in the authentication processing device.

9. The flash memory apparatus of claim 8, further comprising:
an authentication request unit that inputs the challenge values received from the authentication processing device or the challenge values generated in the flash memory apparatus itself into the challenge input unit; and
an authentication processing unit that transmits the response values output from the response output unit in correspondence with the input challenge values to the authentication processing device,
wherein the authentication processing device processes authentication by comparing the response values matched with the input challenge values among the pre-stored challenge-response pairs and the response values received from the authentication processing unit.

10. A method for embodying a physical unclonable function (PUF) through a flash memory apparatus comprising a flash memory unit having a main memory area and a peripheral memory area, the method comprising:
receiving input of a challenge value;
setting a read voltage based on the challenge value;
reading data by applying the read voltage to a memory cell included in the peripheral memory area; and
outputting the read data as a response value corresponding to the challenge value;
wherein the step of reading data reads at least one of a first data value based on setting data regarding an operation environment of the flash memory unit and a second value stored randomly in a pre-set memory area in the peripheral memory area, the pre-set memory area includes a plurality of memory cells including two or more memory cells having different threshold voltages; and
wherein the read voltage is changeable within a pre-set voltage level range each time the challenge value is input.

11. The method of claim 10, wherein the step of setting the read voltage sets a read voltage to be applied to the memory cell by detecting the read voltage pre-matched with each of the challenge values from the plurality of the pre-set read voltage levels.

12. The method of claim 10, further comprising randomly programming different data in at least two of the plurality of the memory cells included in the pre-set memory area, prior to the receiving of the input of the challenge value.

13. The method of claim 10, further comprising
detecting at least one of voltage information, current information, speed information, trim information, option information, repair information, and bad block information, which operate the flash memory unit, from the setting data at the time of an initial test for the flash memory unit; and
programming the at least one detected information in the pre-set memory area, prior to the receiving of the input of the challenge value.

14. The method of claim 13, wherein the step of programming comprises:
detecting trim information to compensate at least one of an initial voltage, an initial current and an initial speed, which are generated in the flash memory unit through the initial test, to correspond to a reference voltage, a reference current and a reference speed, which are pre-set for driving of the flash memory unit; and
programming a trimming code composing the detected trim information in the pre-set memory area.

15. The method of claim 13, wherein the step of programming comprises:
detecting bad block information, for which a data reading process in the flash memory unit through the initial test has been failed, and
programming an address of at least one of a defective bit line and a defective block composing the detected bad block information in the pre-set memory area.

16. The method of claim 10, wherein the step of receiving the input of the challenge value receives input of the challenge values received from a pre-set authentication processing device or the challenge values generated in the flash memory apparatus itself as an authentication request.

17. The method of claim 10, further comprising:
receiving sequential input of a plurality of challenge values promised in advance to a pre-set authentication processing device;
setting a read voltage for each of the input challenge values;
reading data by applying the read voltage to a memory cell of the pre-set memory area based on the input challenge values;
outputting the read data as a response value corresponding to each of the input challenge values;
generating a plurality of challenge-response pairs by matching the output response values and the input challenge values with each other; and
providing the plurality of the challenge-response pairs to the authentication processing device,
wherein the challenge-response pairs are stored in the authentication processing device, prior to the step of receiving the input of the challenge value.

18. The method of claim 17, wherein the response values transmitted to the authentication processing device are used for authentication processing on the authentication processing device through comparison with the response values matched with the input challenge values among the pre-stored challenge-response pairs.

* * * * *